US010712477B2

(12) United States Patent
Lee et al.

(10) Patent No.: US 10,712,477 B2
(45) Date of Patent: Jul. 14, 2020

(54) LENS STRUCTURE FORMED BY MATERIALS IN DIFFERENT REFRACTIVE INDEXES

(71) Applicant: CONCRAFT HOLDING CO., LTD., Grand Cayman (KY)

(72) Inventors: Chin-Hsing Lee, New Taipei (TW); Feng-Cheng Chung, New Taipei (TW); Jie-Ru Chen, New Taipei (TW)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 159 days.

(21) Appl. No.: 16/053,176

(22) Filed: Aug. 2, 2018

(65) Prior Publication Data
US 2019/0302320 A1    Oct. 3, 2019

(30) Foreign Application Priority Data

Apr. 3, 2018  (TW) .............................. 107111720 A

(51) Int. Cl.
| G02B 3/04 | (2006.01) |
| G02B 13/00 | (2006.01) |
| G02B 9/02 | (2006.01) |
| G02B 5/00 | (2006.01) |
| G02B 3/00 | (2006.01) |
| G02B 7/02 | (2006.01) |

(52) U.S. Cl.
CPC .............. *G02B 3/04* (2013.01); *G02B 5/005* (2013.01); *G02B 9/02* (2013.01); *G02B 13/005* (2013.01); *G02B 13/006* (2013.01); *G02B 7/027* (2013.01); *G02B 2003/0093* (2013.01)

(58) Field of Classification Search
CPC . G02B 3/04; G02B 5/005; G02B 9/02; G02B 13/005; G02B 13/006; G02B 7/027; G02B 2003/0093
USPC ......................................... 359/642, 708, 717
See application file for complete search history.

(56) References Cited

U.S. PATENT DOCUMENTS

| 4,897,136 A * | 1/1990 | Bailey .................... G02B 5/128 |
| | | 156/145 |
| 6,288,842 B1 * | 9/2001 | Florczak ................ G02B 5/128 |
| | | 359/619 |
| 6,841,096 B2 * | 1/2005 | Quake ............... B01L 3/502715 |
| | | 264/2.5 |

(Continued)

FOREIGN PATENT DOCUMENTS

TW              I356760 B       1/2012

*Primary Examiner* — Tuyen Tra
(74) *Attorney, Agent, or Firm* — Muncy, Geissler, Olds & Lowe, PC

(57) ABSTRACT

A lens structure formed by materials in different refractive indexes includes a sphere, a first lens and a separation layer which is disposed between the sphere and the first lens. The sphere and the first lens have a different refractive index and the sphere is a round ball. The first lens is formed on the sphere that part of the sphere is exposed out of the first lens, and the first lens includes a first light absorption curve. The separation layer includes a transparent section opposite to the first light absorption curve. When a light beam passes through the second portion of the sphere to form a first light condensing effect and enter the sphere, the light beam will then pass through the transparent section to enter the first lens, forming a second light condensing effect after passing through the first light absorption curve.

10 Claims, 9 Drawing Sheets

(56) References Cited

U.S. PATENT DOCUMENTS

| | | | |
|---|---|---|---|
| 7,170,688 B2 * | 1/2007 | Handerek | C03C 12/02 359/652 |
| 9,304,280 B2 * | 4/2016 | Gulari | G02B 7/027 |
| 2006/0226560 A1 | 10/2006 | Yu | |

* cited by examiner

LENS STRUCTURE FORMED BY MATERIALS IN DIFFERENT REFRACTIVE INDEXES

BACKGROUND OF THE INVENTION a) Field of the Invention

The present invention relates to a lens structure, and more particularly to a lens structure which is provided with high coaxiality and is formed by materials in different refractive indexes.

b) Description of the Prior Art

The optical lens has been developed gradually from a single lens to a multi-layered lens, in order to satisfy the specific request for light propagation. The multi-layered lenses are utilized to change the optical path, so as to eliminate the optical aberration and the spherical aberration. However, this needs to assemble each lens on a lens holder sequentially and therefore it will be more tedious in assembling and will also waste more space. In addition, to assemble the multi-layered lens, each lens should have high coaxiality to avoid the deviation in the optical axis.

To improve the aforementioned problems, a Taiwanese Invention Patent 1356760 has disclosed a superimposed lens and manufacturing method and device thereof, including an optical axis, more than one base material and more than one optical heat-resistant colloid layer. Each optical heat-resistant colloid, layer includes a colloid layer optically effective circumference, and the axis of the optically effective circumference is superimposed with the optical axis. A center part of each base material includes a base material optically effective circumference. When the surface of the optically effective circumference is attached on the optical heat-resistant colloid layer, the axis of the base material optically effective circumference will be superimposed with the axis of the colloid layer optically effective circumference. The optical heat-resistant colloid layer is first titrated on a mold, and then the base material is attached to the optical heat-resistant colloid layer.

Furthermore, a US Patent Publication No. 20060226560 has disclosed a method for manufacturing a composite lens. First, a base-layer-forming material, a composite-layer-forming material, a base-layer-forming stamper and a composite-layer-forming stamper are provided. Each of the forming stampers is provided with a forming surface. Next, the base-layer-forming stamper is used to emboss the mounting-type surface on the base-layer-forming material, forming a base layer of the composite lens. Then, the composite-layer-forming stamper is used to emboss the forming surface thereof on the composite-layer-forming material and emboss the composite-layer-forming material on the base layer of the composite lens, forming a composite layer of the composite lens.

Accordingly, the composite lens is used to replace the assembly of multi-layered lens, so as to satisfy the requirement of high coaxiality. However, in forming the aforementioned composite lens, the steps are tedious, and it will also need various adhesive materials to increase the adhesive force among the lenses to avoid ablation among the lenses.

Therefore, the technical means and the object thereof to be solved by the present invention are the provision of a lens structure with high coaxiality to replace the multi-layered lens.

SUMMARY OF THE INVENTION

The primary object of the present invention is to provide a lens structure which is provided with high coaxiality and is formed by materials in different refractive indexes.

To achieve the aforementioned object, the present invention discloses a lens structure which is formed by materials in different refractive indexes, comprising a sphere, a first lens and a separation layer. The sphere is transparent and is provided with a first refractive index. The sphere is a round ball formed by a first portion and a second portion which is connected with the first portion. In addition, the second portion is provided with a first light condensing effect. The first lens is transparent and is provided with a second refractive index which is different from the first refractive index of the sphere. The first lens is formed on the first portion of the sphere, the second portion of the sphere is protruded out of the first lens, and the first lens is provided with a first light absorption curve opposite to the first portion of the sphere. The separation layer is provided with a transparent section opposite to the first light absorption curve, and a non-transparent section formed at a periphery of the transparent section. After passing through the second portion of the sphere to form the first light condensing effect and enter the sphere, a light beam will pass through the transparent section to enter the first lens and then pass through the first light absorption curve to form a second light condensing effect.

In an embodiment, the second portion of the sphere is a convex lens on the first lens, and the first light absorption curve of the first lens is a concave lens.

In an embodiment, the sphere is a glass ball, and the first lens is formed on the first portion of the sphere by injection molding to transparent silica gel; whereas, the separation layer is no, transparent.

In an embodiment, the first, lens is further provided with a first embedding slot opposite to the first light absorption curve, and the separation layer and the first portion of the sphere are disposed in the first embedding slot orderly.

To achieve the aforementioned object, the present invention further discloses a lens structure which is formed by materials in different refractive indexes, comprising a sphere, a first lens, a separation layer and a second lens. The sphere is transparent and is provided with a first refractive index. In addition, the sphere is a round ball formed by a first portion and a second portion which is connected with the first portion. The first lens is transparent and is provided with a second refractive index which is different from the first refractive index of the sphere. The first lens is formed on the first portion of the sphere, and the second portion of the sphere is protruded out of the first lens. The first lens is provided with a first light absorption curve opposite to the first portion of the sphere. The separation layer is disposed between the first portion of the sphere and the first lens, and is provided with a transparent section opposite to the first light absorption curve as well as a non-transparent section formed at a periphery of the transparent section. The second lens is transparent and is provided with a third refractive index which is different from the first refractive index of the sphere. The second lens is formed on the second portion of the sphere and is opposite to the first lens, allowing the sphere and the separation layer to be enclosed between the first lens and the second lens. On the other hand, the second lens is provided with a second light absorption curve which is separated from the second portion of the sphere, so that a light beam can pass through the second light absorption curve to form a first light condensing effect and enter the second lens, next pass through the second portion to form a second light condensing effect and enter the sphere, and finally pass through the transparent section to enter the first lens followed by passing through the first light absorption curve to form a third light condensing effect.

In an embodiment, the second light absorption curve of the second lens is a convex lens, and the first light absorption curve of the first lens is a concave lens.

In an embodiment, the sphere is a glass ball, and the first lens and the second lens are all formed on the first portion of the sphere by injection molding to transparent silica gel, allowing the second refractive index of the first lens to be the same as the third refractive index of the second lens.

In an embodiment, the sphere is a glass ball, the first lens is formed on the first portion of the sphere by injection molding to transparent silica gel, and the second lens is formed on the second portion of the sphere by injection molding to transparent plastic, allowing the second refractive index of the first lens to be different from the third refractive index of the second lens.

In an embodiment, the separation layer further includes an extension section which is extended to an exterior side of the non-transparent section, and the extension section is disposed between the first lens and the second lens.

In an embodiment, the first lens is further provided with a first embedding slot opposite to the first light absorption curve, and the separation layer and the first portion of the sphere are disposed in the first embedding slot orderly.

In comparison to the prior arts, the lens structure formed by materials in different refractive indexes, according to the present invention, is provided with following advantages:
1. In the present invention, the lens structure formed by materials in multi-layered lens, so as to satisfy the request of high coaxiality and achieve the effect of reducing the space.
2. In the present invention, the sphere in a shape of a round glass ball is used, allowing the entire sphere to form a spherical surface to increase significantly the range of lighting, solve effectively the problem of stray light and increase the light absorption efficiency, thereby reducing the imaging dark region, and solving the problems of astigmatism and optical aberration to improve the imaging quality.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
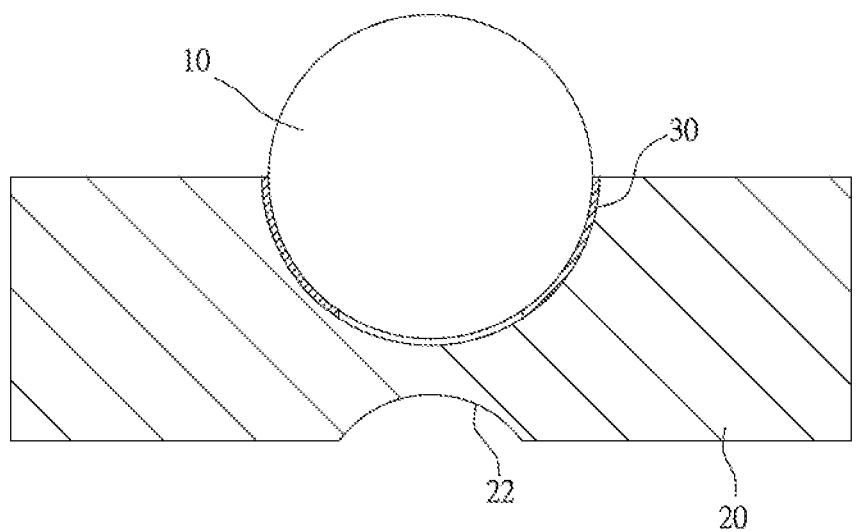
FIG. 1 shows a cutaway view of a first embodiment of the present invention.
Figure 2:
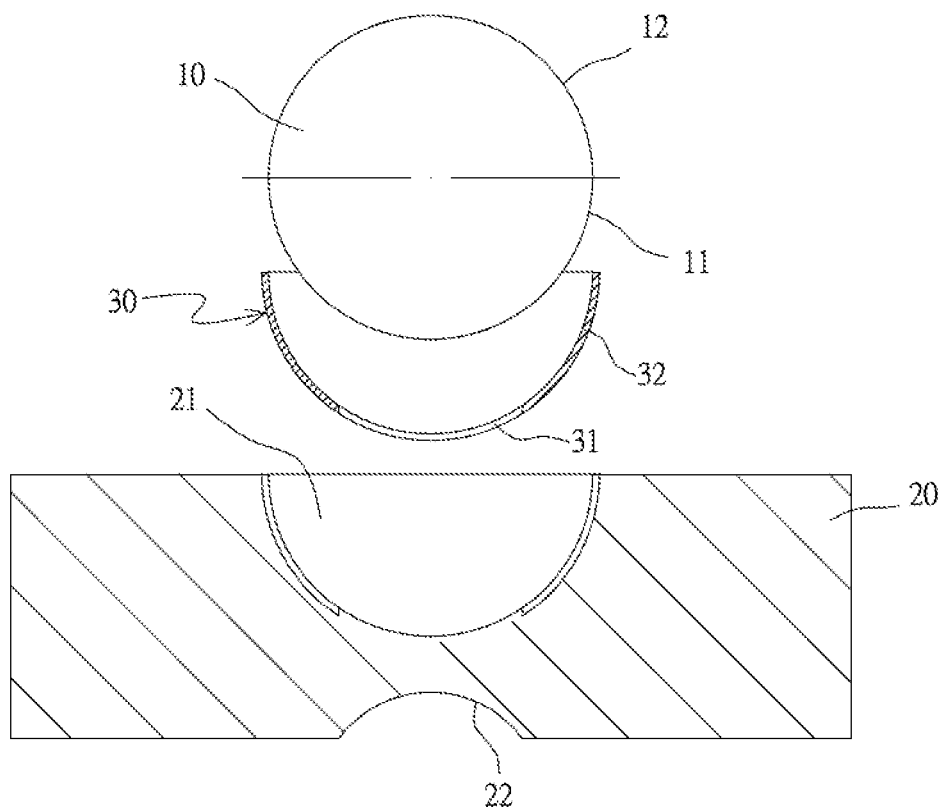
FIG. 2 shows an exploded view of the first embodiment of the present invention.

Referring to FIG. 1 and FIG. 2, it shows a first embodiment provided by the present invention which discloses a lens structure formed by materials in different refractive indexes. The lens structure comprises a sphere 10, a first, lens 20 and a separation layer 30.

Specifically, the sphere 10 is provided with a first portion 11 and a second portion 12 which is connected with the first portion 11 to become an integrated unit. The first portion 11 and the second portion 12 constitute a transparent round ball and the sphere 10 is provided with a first refractive index. The first lens 20 is formed on a side of the sphere 10, and a first embedding slot 21 is disposed on the first lens 20 in adjacent to the first portion 11 of the sphere 10 to embed the first portion 11, allowing the first portion 11 to be embedded into the first embedding slot 21, so that the second portion 12 of the sphere 10 can be exposed out of the first lens 20 to form a convex lens on the first lens 20. On the other hand, a first light absorption curve 22 is disposed on the first lens 20 opposite to the other side of the sphere 10, and the first light absorption curve 22 is a concave lens. The first lens 20 is transparent too and is provided with a second refractive index which is different from the first refractive index of the sphere 10. The separation layer 30 is not transparent and is disposed between the first portion 11 of the sphere 10 and the first embedding slot 21 of the first lens 20. The separation layer 30 is provided with a transparent section 31 opposite to the first light absorption curve 22, as well as a non-transparent section 32 formed at a periphery of the transparent section 31. The transparent section 31 is a through-hole, and the non-transparent section 32 is annularly disposed on the periphery of the transparent section 31.

In the present embodiment, the sphere 10 is a glass ball, allowing the whole circumference of the sphere 10 to form a spherical surface. On the other hand, the first lens 20 is formed by transparent silica gel. As the transparent silica gel is transparent and highly adhesive, the first lens 20 can be attached effectively with the sphere 10 and the separation layer 30.

Figure 3:
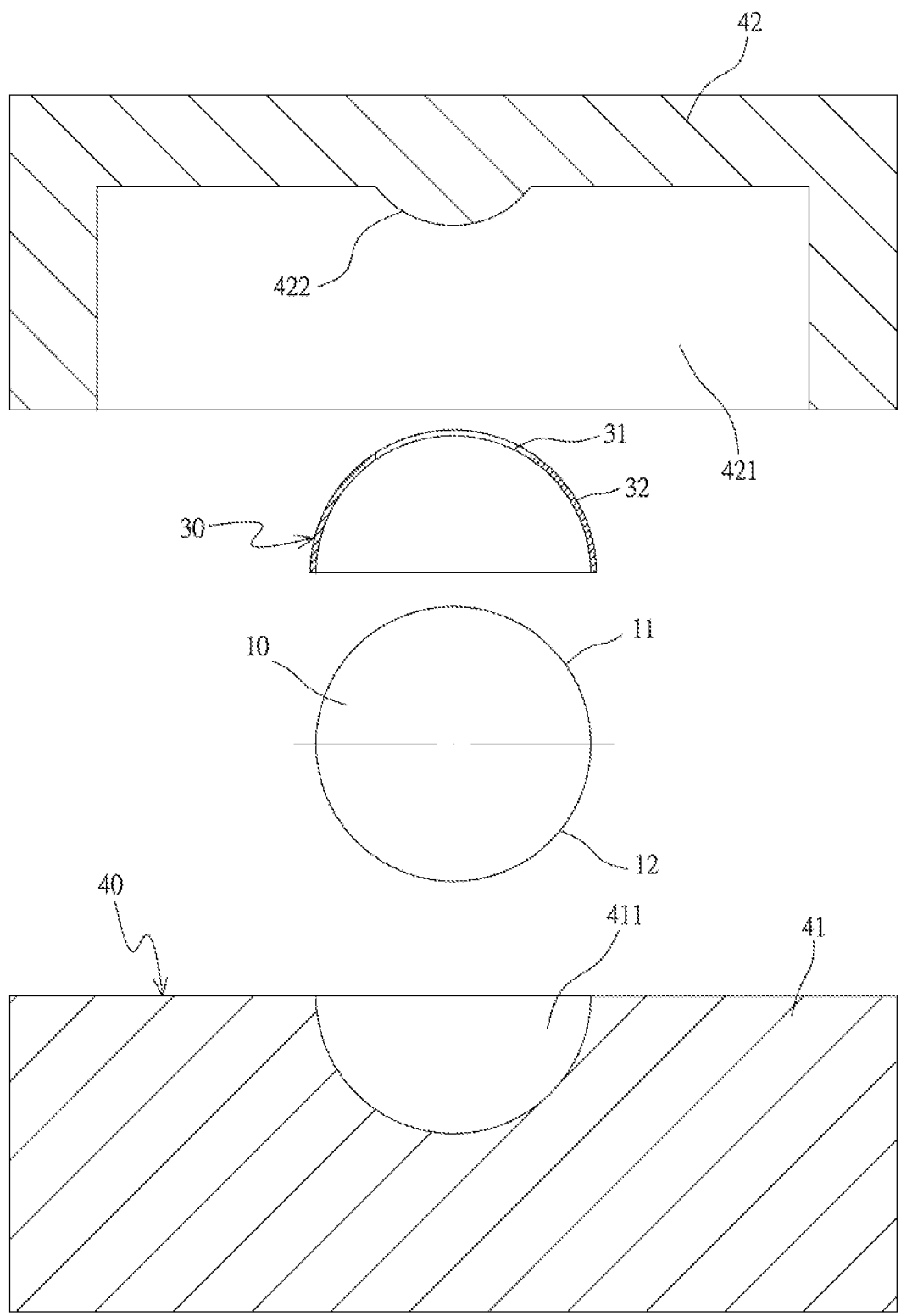
FIG. 3 shows an exploded view of the present invention which is used to produce a mold of the first embodiment.
Figure 4:
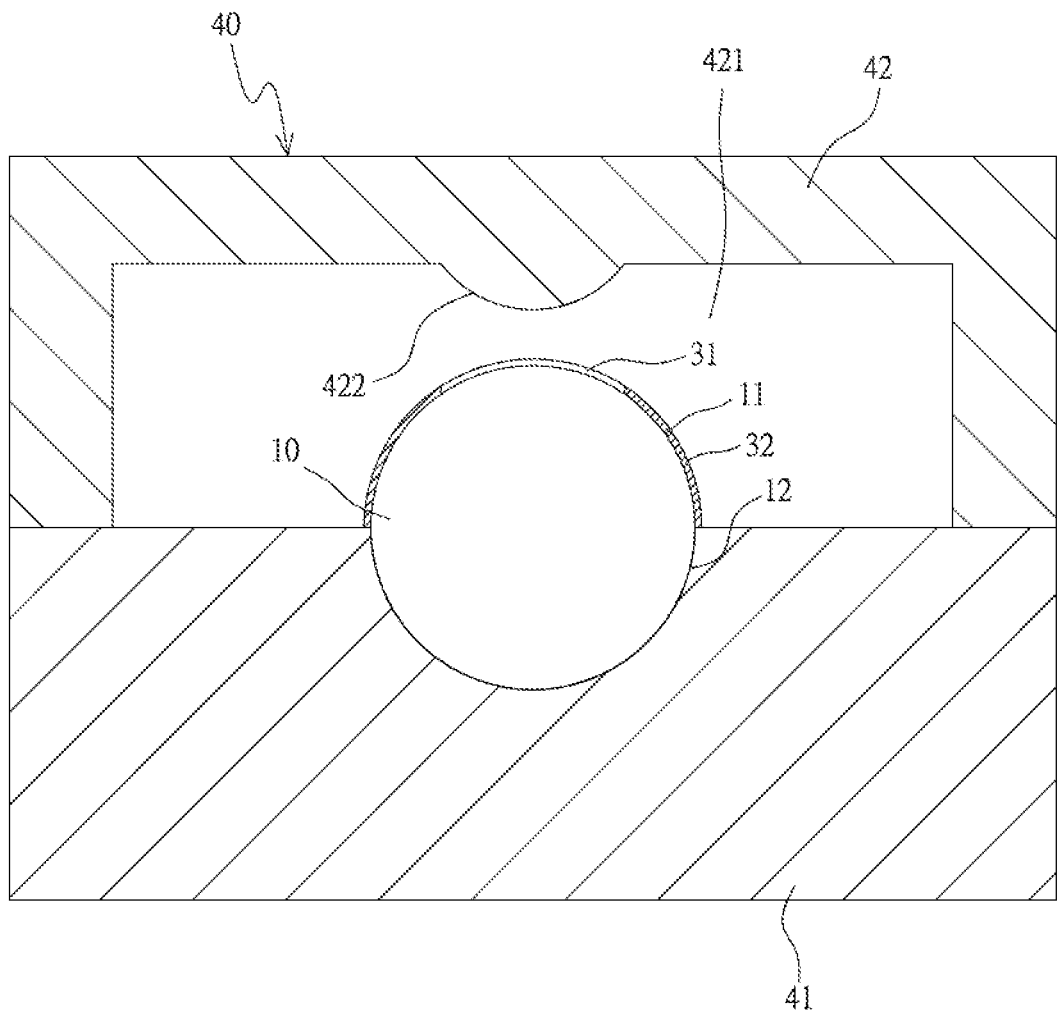
FIG. 4 shows an assembly view of the present invention which is used to produce a mold of the first embodiment.

Referring to FIGS. 2 to 4, in the present embodiment, to form the first lens 20, a first mold 40 is provided first. The first mold 40 includes a first die holder 41 and a second die holder 42. The first die holder 41 is provided with a positioning slot 411 to accommodate the second portion 12 of the sphere 10, so that when the sphere 10 is disposed in the positioning slot 411 by the second portion 12, the first portion 11 of the sphere 10 can be exposed out of the first die holder 41. Next, the separation layer 30 is covered on the first portion 11 of the sphere 10, and the separation layer 30 is adhered and attached with the first portion 11. On the other hand, the second die holder 42 is provided with a first forming space 421 opposite to the first die holder 41, and an interior of the first forming space 421 is formed with a protruded part 422 on a surface opposite to the first die holder 41. After the second die holder 42 is assembled with the first die holder 41, the first forming space 421 on the second die holder 42 is closed by the first die holder 41, and the first portion 11 of the sphere 10 and the separation layer 30 are made to be disposed in the first forming space 421. Next, transparent silica gel in the liquid state is injected into the first forming space 421, and when the transparent silica gel in the liquid state is cooled down and solidified into the solid silica gel, the first lens 20 can be formed in the first forming space 421 and fixed on the first portion 11 of the sphere 10 and the separation layer 30, forming a first, embedding slot 21 on an exterior side of the first portion 11 of the sphere 10. In addition, the first light absorption curve 22 will be formed on the protruded part 422, and the transparent section 31 is made to be opposite to the first light absorption curve 22, as shown in FIG. 2. Then, the first die holder 41 is separated from the second die holder 42, and the first lens 20 and the sphere 10 are extracted at a same time, forming the lens structure in the first embodiment of the present invention.

Figure 5:
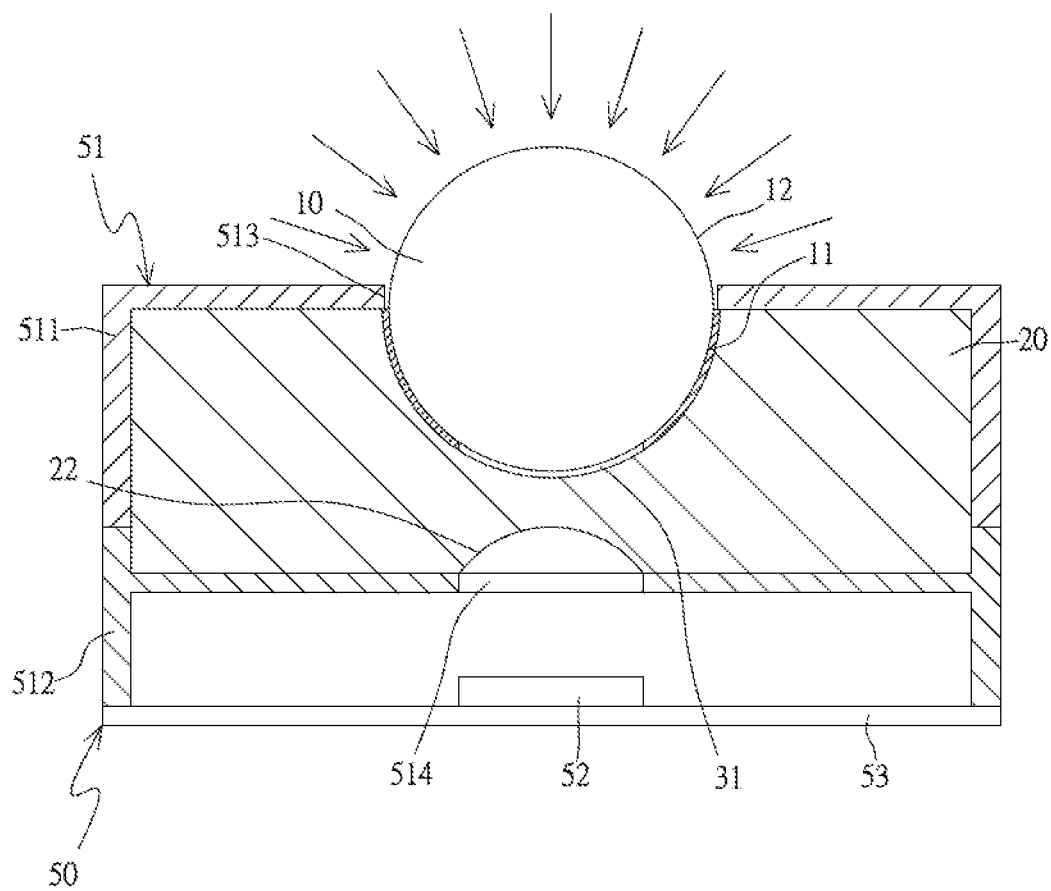
FIG. 5 shows a cutaway view of the first embodiment of the present invention which is applied to a photography module.

Referring to FIG. 5, the first embodiment of the present invention is applied to a photography module 50. The photography module 50 includes a lens base 51, an image sensing module 52 and a circuit board 53. The lens base 51 includes a first base 511 and a second base 512 which is assembled on the first base 511. A collecting space is formed between the first base 511 and the second base 512, and the first lens 20 can be directly disposed in the co letting space. Therefore, the first lens 20 can be quickly assembled in the lens base 51. On the other hand, the first base 511 is provided with an incident hole 513 for transfixing the second portion 12 of the sphere 10. The second portion 12 is exposed out of the first base 511 through the incident hole 513. The second base 512 is provided with a receiving hole 514 in adjacent to the first light absorption curve 22, and the image sensing module 52 is disposed below the receiving hole 514 and is connected electrically on the circuit board 53.

Accordingly, as the second portion 12 of the sphere 10 is a spherical surface and is exposed out of the lens base 51, when a light beam passes through the second portion 12 of the sphere 10 from an exterior side of the lens base 51, the range of lighting outside the lens base 51 can be increased by the second portion 12. Moreover, when the light beam passes through the second portion 12, a first light condensing effect will be formed. The light beam will then enter the sphere 10 and pass through the transparent section 31 of the separation layer 30 to enter the first lens 20. Next, the light beam passes through the first light absorption curve 22 of the first lens 20, forming a second light condensing effect after passing through the first light absorption curve 22. Finally, the light beam that forms the second light condensing effect will pass through the receiving hole 514 to enter the image sensing module 52, thereby solving the problem of stray light effectively, increasing the light absorption efficiency, reducing the imaging dark region and improving the imaging quality.

Moreover, as the first lens 20 is formed directly on the sphere 10 by injection molding, the machining accuracy of the first mold 40 (as shown in FIG. 3) can be utilized to control the coaxiality among the sphere 10, the first lens 20 and the separation layer 30 more effectively, thereby satisfying the request of high coaxiality for the multi-layered lens. In addition, as the first lens 20 is formed on the sphere 10 by injection molding, the volume of the first lens 20 can be controlled effectively, thereby reducing effectively the volume of the photography module 50 to achieve the effect of reducing the space of the photography module 50.

Figure 6:
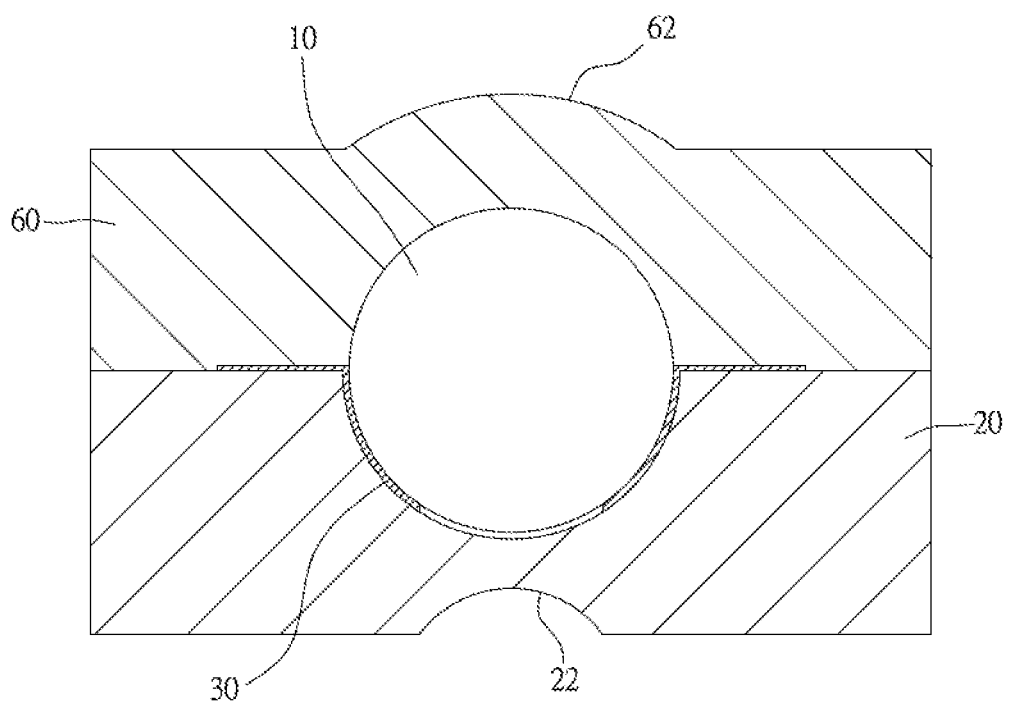
FIG. 6 shows a cutaway view of a second embodiment of the present invention.
Figure 7:
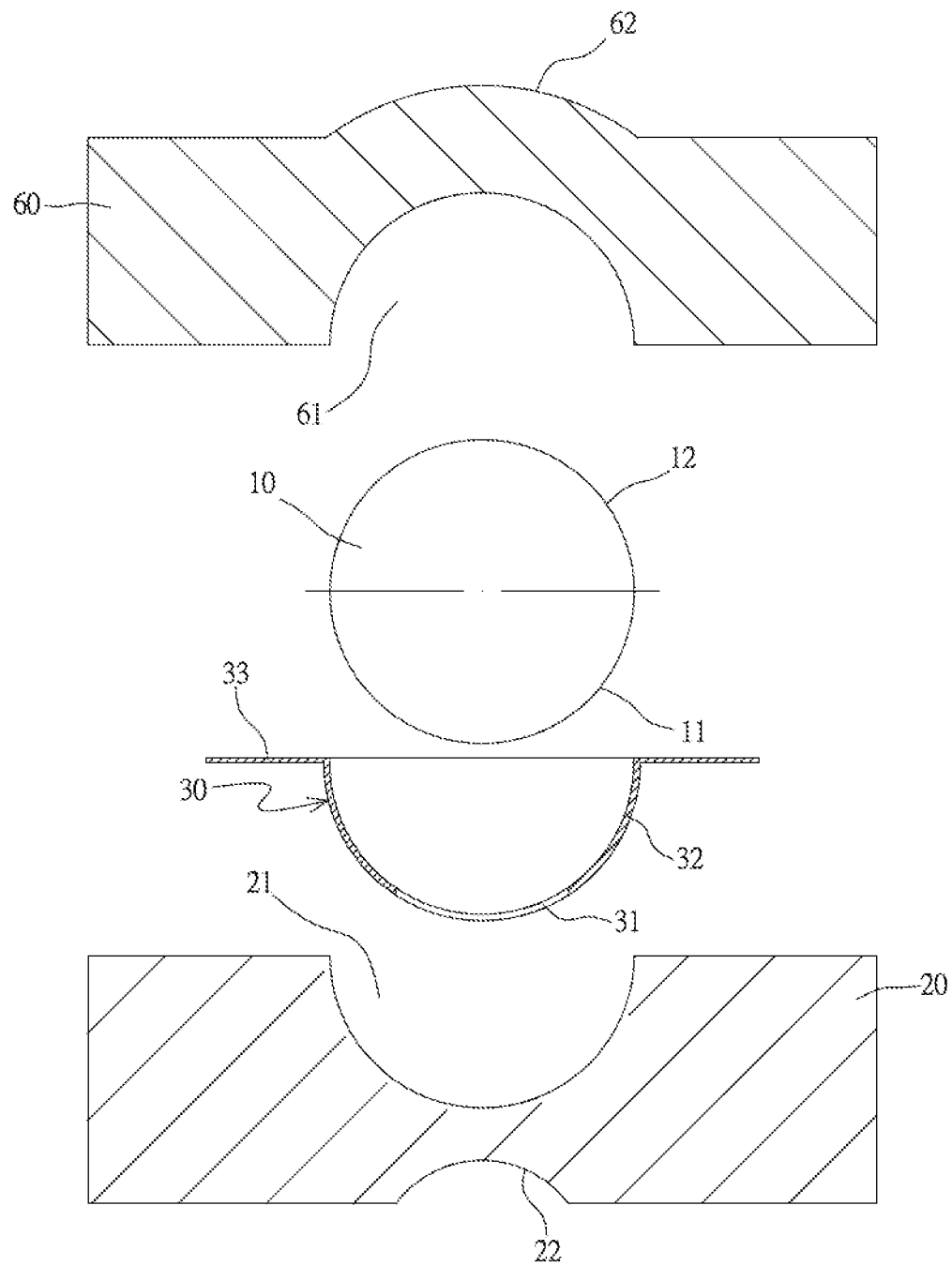
FIG. 7 shows an exploded view of the second embodiment of the present invention.

Referring to FIG. 6 and FIG. 7, it shows a second embodiment of the present invention. In the present embodiment, the lens structure is formed by the sphere 10, the first lens 20, the separation layer 30 and a second lens 60. The second lens 60 is disposed on the second portion 12 of the sphere 10 and is op polite to the first lens 20, so that the sphere 10 can be enclosed between the first lens 20 and the second lens 60. On the other hand, the second lens 60 is provided with a second embedding slot 61 on a surface in adjacent to the first lens 20, with the second embedding slot 61 being opposite to the first embedding slot 21 of the first lens 20 and providing for embedding the second portion 12 of the sphere 10. In addition, the second lens 60 is formed with a second light absorption curve 62 on the other surface away from the first lens 20. The second light absorption curve 62 is a convex lens and is separated from the second portion 12 of the sphere 10. The separation layer 30 further includes an extension section 33 which is annularly disposed outside the non-transparent section 32, and the extension section 33 is disposed between the first lens 20 and the second lens 60. In the present embodiment, the first lens 20 and the second lens 60 are all formed by injection molding to transparent silica gel, so that the second lens 60 can be provided with a third refractive index which is the same as the second refractive index. The first lens 20 and the second lens 60 are assembled into a cylinder. It is definitely that in practical applications, the first lens 20 and the second lens 60 can be also formed by transparent materials in different refractive indexes. For example, the second lens 60 is formed by injection molding to transparent plastic, so that the sphere 10, the first lens 20 and the second lens 60 can be provided with different refractive indexes.

Figure 8:
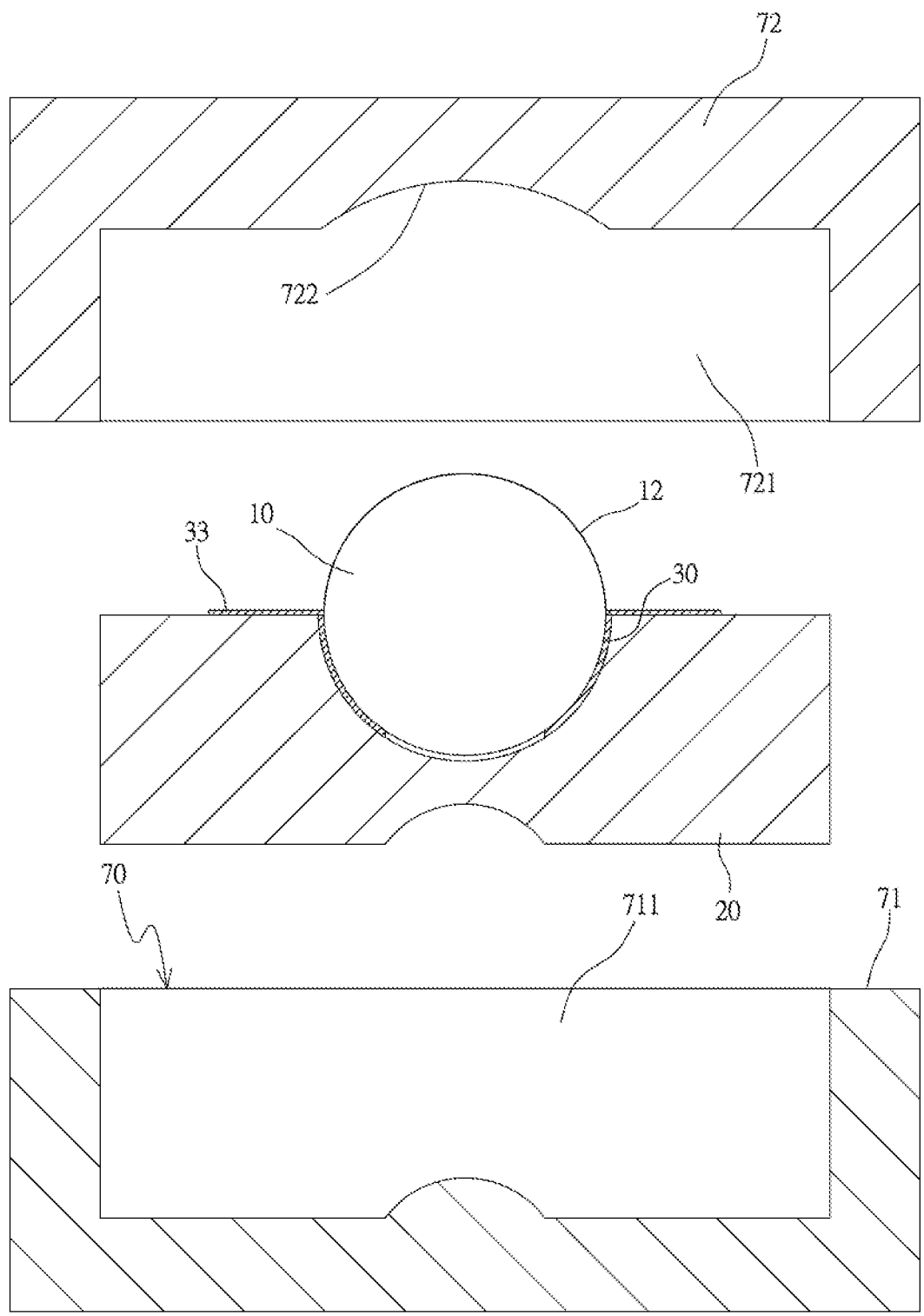
FIG. 8 shows an exploded view of producing a first mold of the second embodiment, according to the present invention.
Figure 9:
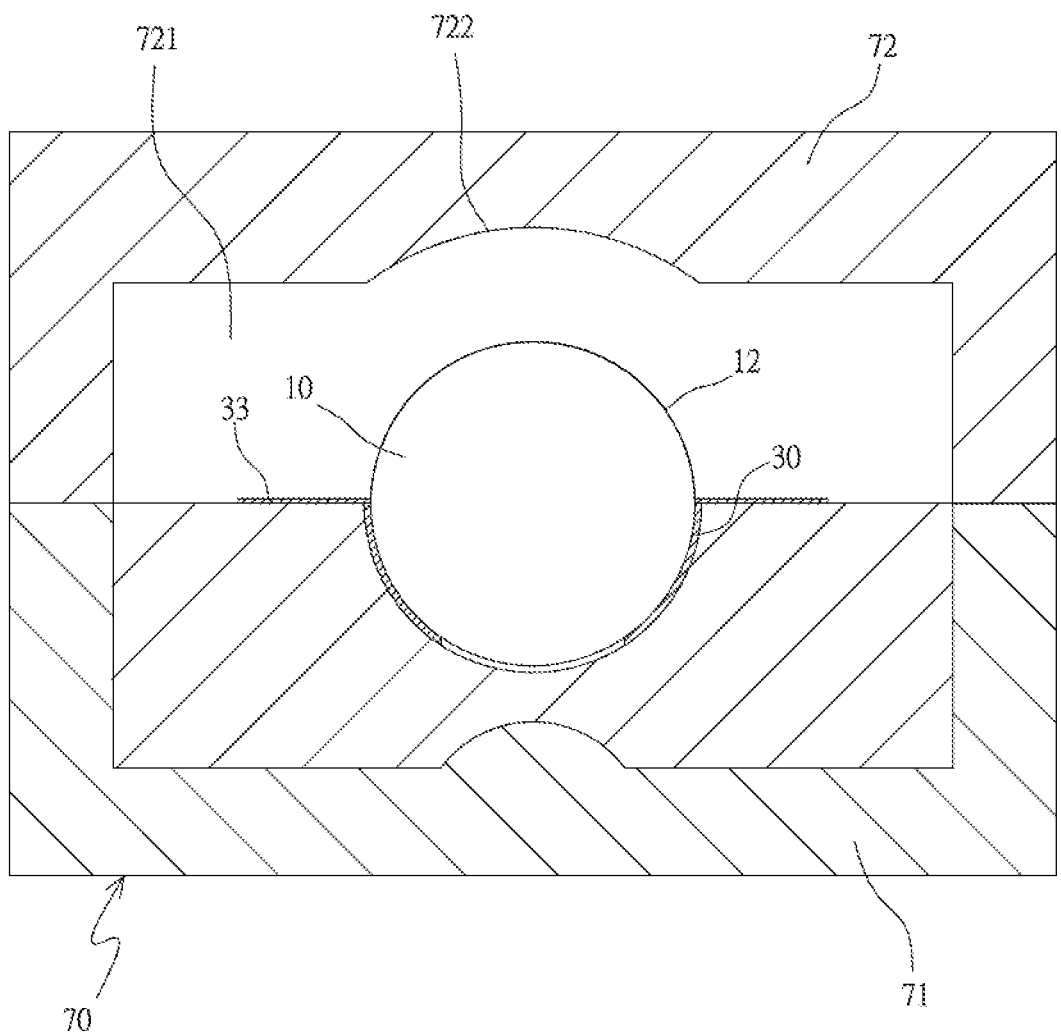
FIG. 9 shows an assembly view of producing the first mold of the second embodiment, according to the present invention.

Referring to FIG. 8 and FIG. 9, to form the second lens 60, the first lens 20 that is formed on the sphere 10 is disposed in a second, mold 70, and then the second lens 60 is formed by injection molding. The second mold 70 includes a third die holder 71 and a fourth die holder 72 which is assembled with the third die holder 71. An interior of the third die holder 71 is provided with a positioning space 711 for embedding the first lens 20. The positioning space 711 is in a same shape as that of the first lens 20, allowing the first lens 20 to be completely embedded in the positioning space 711, and enabling the second portion 12 of the sphere 10 and the extension section 33 of the separation layer 30 to be exposed out of the third die holder 71. On the other hand, the fourth die holder 72 is assembled with the third die holder 71, and is provided with a second forming space 721, so that when the fourth die holder 72 is assembled with the third die holder 71, the second portion 12 of the sphere 10 and the extension section 33 of the separation layer 30 can be disposed in the second forming space 721. In addition, an interior of the second forming space 721 is provided with a concave portion 722. The concave portion 722 is separated from the second portion 12 of the sphere 10.

After the fourth die holder 72 is assembled with the third die holder 71, the second forming space 721 on the fourth die holder 72 is closed by the third die holder 71 and the second portion 12 of the sphere 10 and the extension section 33 of the separation layer 30 are disposed in the second forming space 721. Next, transparent silica gel in the liquid state is injected into the second forming space 721. After the transparent silica gel in the liquid state is cooled down and solidified into the solid silica gel, the second lens 60 (as shown in FIG. 6) can be formed in the second forming space 721 and is fixed on the second portion 12 of the sphere 10 and the extension section 33 of the separation layer 30. In addition, the second light absorption curve 62 will be formed on a location opposite to the concave portion 722, so that the second light absorption curve 62 can be separated from the second portion 12, as shown in FIG. 6. Next, the third die holder 71 is separated from the fourth die holder 72, and the first lens 20 and the second lens 60 are extracted at a same time, forming the lens structure in the second embodiment of the present invention, and enabling the first lens 20 and the second lens 60 to form a cylinder.

Figure 10:
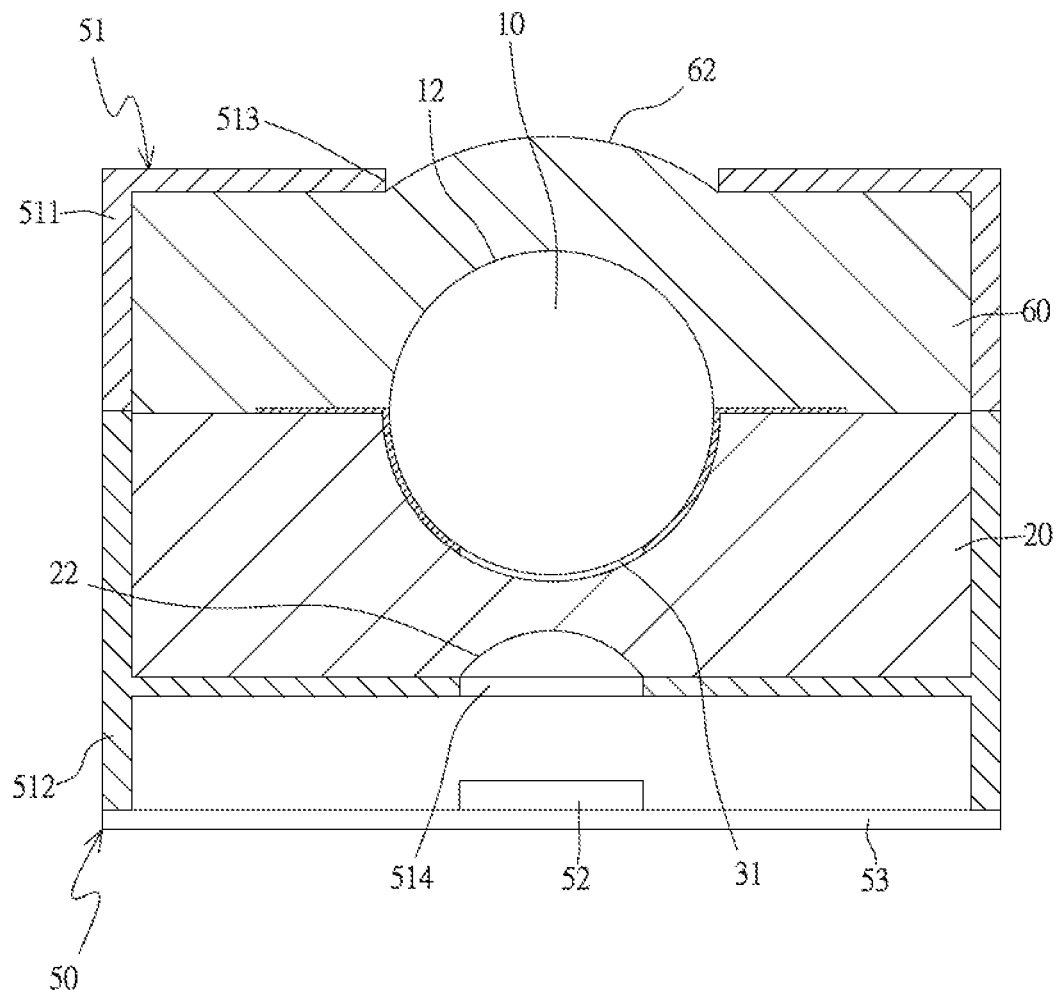
FIG. 10 shows a cutaway view of the second embodiment of the present invention which is applied to the photography module.

Therefore, as shown in FIG. 10, when the second embodiment of the present invention is applied to the photography module 50, the first lens 20 and the second lens 60 that are assembled into the cylinder are installed in the lens base 51, a lowing the second light absorption curve 62 of the second lens 60 to be exposed out of the lens base 51 through the incident hole 513; whereas, the first light absorption curve 22 of the first lens 20 is in adjacent to the receiving hole 514, allowing the first light absorption curve 22 to be in adjacent to the image sensing module 52. When a light beam passes through the second light absorption curve 62 from an exterior side of the lens base 51, a first light condensing effect will be formed, enabling the light beam to enter the second lens 60. Next, the light beam will pass through the second portion 12 of the sphere 10 to form a second light condensing effect, followed by entering the sphere 10. After entering the the sphere 10, the light beam will pass through the sphere 10 to enter the first lens 20, followed by passing through the first light absorption curve 22 to form a third light condensing effect. Finally, the light beam will pass through the receiving hole 514 to enter the image sensing module 52. Accordingly, it can similarly solve the problem of stray light effectively, increase the light absorption efficiency, reduce the imaging dark region, and solve the problems of astigmatism and optical aberration, thereby improving the imaging quality.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A lens structure formed by materials in different refractive indexes, comprising a sphere, a first lens and a separation layer, wherein the sphere is transparent, is provided with a first refractive index, and is a round ball formed by a first portion and a second portion which is connected with the first portion, with that the second portion is equipped with a first light condensing effect; the first lens is transparent and is provided with a second refractive index which is different from the first refractive index of the sphere, with that the first lens is formed on the first portion of the sphere, the second portion of the sphere is protruded out of the first lens, and the first lens is provided with a first light absorption curve opposite to the first portion of the sphere; and the separation layer is disposed between the first portion of the sphere and the first lens, and is provided with a transparent section opposite to the first light absorption curve and a non-transparent section which is formed at a periphery of the transparent section, with that when a light beam passes through the second portion of the sphere to form the first light condensing effect and then enter the sphere, the light beam passes through the transparent section to enter the first lens, and then passes through the first light absorption curve to form a second light condensing effect.

2. The lens structure formed by materials in different refractive indexes, according to claim 1, wherein the second portion of the sphere is a convex lens on the first lens, and the first light absorption curve of the first lens is a concave lens.

3. The lens structure formed by materials in different refractive indexes, according to claim 2, wherein the sphere is a glass ball, the first lens is formed on the first portion of the sphere by injection molding to transparent silica gel, and the separation layer is not transparent.

4. The lens structure formed by materials in different refractive indexes, according to claim 1, wherein the first lens is further provided with a first embedding slot opposite to the first light absorption curve, and the separation layer and the first portion of the sphere are disposed in the first embedding slot orderly.

5. A lens structure formed by materials in different, refractive indexes, comprising a sphere, a first lens, a separation layer and a second lens, wherein the sphere is transparent, is provided with a first refractive index, and is a round ball formed by a first portion and a second portion which is connected with the first portion; the first lens is transparent and is provided with a second refractive index which is different from the first refractive index of the sphere, with that the first lens is formed on the first portion of the sphere, and is provided with a first light absorption curve opposite to the first portion of the sphere; the separation layer is disposed between the first portion of the sphere and the first lens, and is provided with a transparent section opposite to the first light absorption curve and a non-transparent section which is formed at a periphery of the transparent section; and the second lens is transparent and is provided with a third refractive index which is different from the first refractive index of the sphere, with that the second lens is formed on the second portion of the sphere opposite to the first lens that the sphere and the separation layer are enclosed between the first lens and the second lens, and the second lens is provided with a second light absorption curve which is separated from the second portion of the sphere, enabling a light beam to pass through the second light absorption curve to form a first, light condensing effect followed by entering the second lens, next allowing the light beam to pass through the second portion to form a second light condensing effect followed by) entering the sphere, and finally allowing the light beam to pass through the transparent section, enter the first lens and pass through the first light absorption curve to form a third light condensing effect.

6. The lens structure formed by materials in different refractive indexes, according to claim 5, wherein the second light absorption curve of the second lens is a convex lens, and the first light absorption curve of the first lens is a concave lens.

7. The lens structure formed by materials in different refractive indexes, according to claim 5, wherein the sphere is a glass ball, and the first lens and the second lens are all formed on the first portion and the second portion of the sphere by injection molding to transparent silica gel, allowing the second refractive index of the first lens to be the same as the third refractive index of the second lens.

8. The lens structure formed by materials in different refractive indexes, according to claim 5, wherein the sphere is a glass ball, the first lens is formed on the first portion of the sphere by injection molding to transparent silica gel, and the second lens is formed on the second portion of the sphere by injection molding to transparent plastic, allowing the second refractive index of the first lens to be different from the third refractive index of the second lens.

9. The lens structure formed by materials in different refractive indexes, according to claim 5, wherein the separation layer further includes an extension section whit h is extended to an exterior side of the non-transparent section, and the extension section is disposed between the first lens and the second lens.

10. The lens structure formed by materials in different refractive indexes, according to claim 5, wherein the first lens is further provided with a first embedding slot opposite to the first light absorption curve, and the separation layer and the first portion of the sphere are disposed in the first embedding slot orderly.

* * * * *